April 7, 1959 T. H. PEIRCE 2,880,947
MOTOR MOUNTING
Filed Dec. 6, 1954
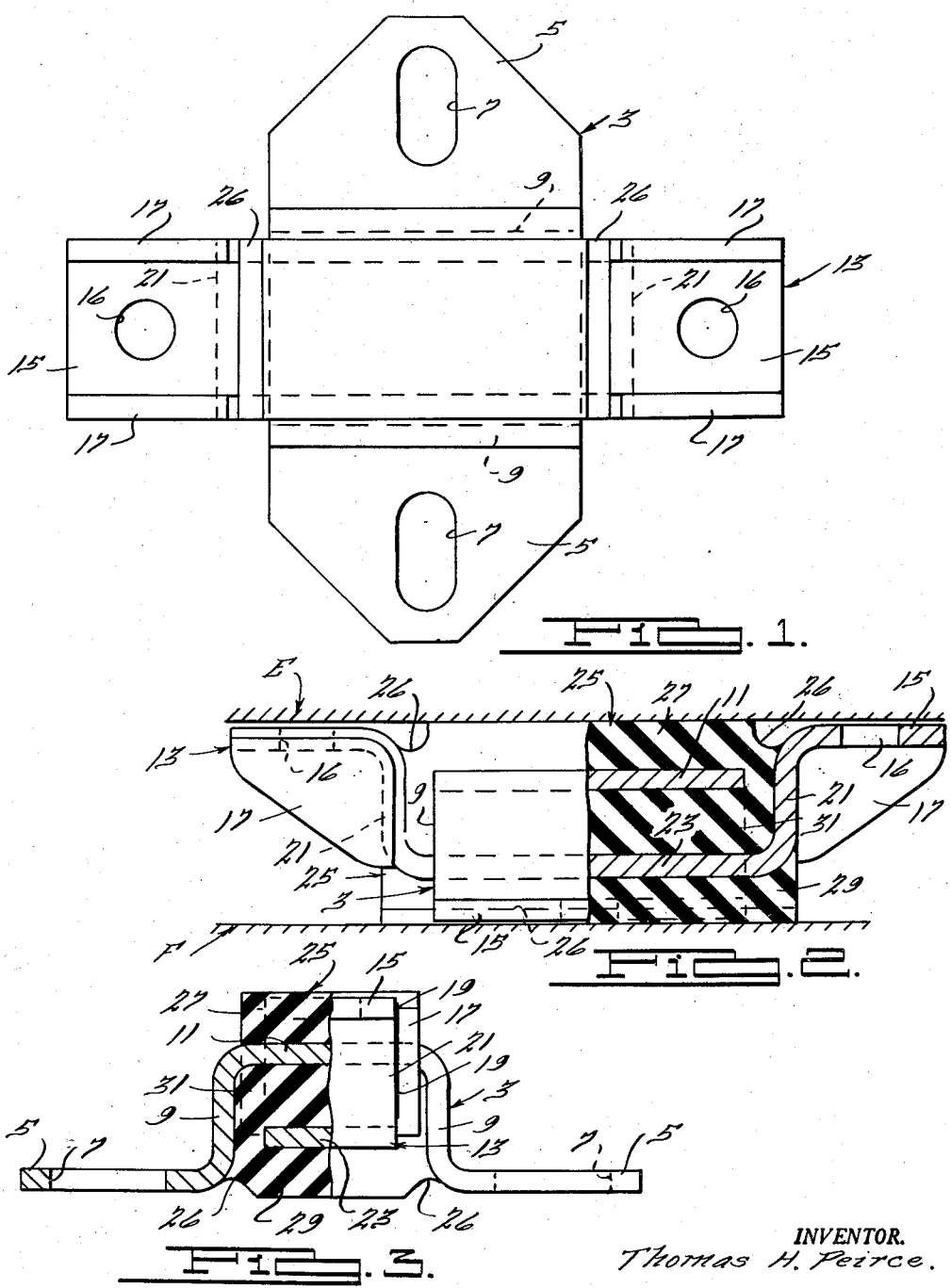
INVENTOR.
Thomas H. Peirce.
BY
Harness, Dickey & Pierce
ATTORNEYS

United States Patent Office 2,880,947
Patented Apr. 7, 1959

2,880,947
MOTOR MOUNTING

Thomas H. Peirce, Detroit, Mich.

Application December 6, 1954, Serial No. 473,278

6 Claims. (Cl. 248—9)

This invention relates to mountings and, in particular, to rubber type mountings such as are used to connect internal combustion engines to frames. A typical application of the invention would be as a motor mounting for resiliently connecting the engine to the chassis of a truck or automobile.

It is an object of this invention to provide a relatively simple motor mount construction which may be economically manufactured and yet which will be highly effective in absorbing engine vibrations and road shocks.

Another object of the invention is to provide a rubber type mounting which will still be operative to connect the engine and the chassis in the event that total failure of the rubber element should occur.

Another object of the invention is to provide a motor mounting in which the rubber element is preloaded on both the top and the bottom.

A further object of the invention is to provide a rubber type motor mounting having thrust absorbing areas and a rebound absorbing area in the rubber element.

The invention accomplishes the foregoing and other objects by means of a construction in which a pair of U-shaped members are arranged in criss-cross fashion, that is at right angles to each other, with the bases of the members facing each other. Both bases are embedded in a rubber element which projects beyond the outermost portions of the members and will therefore contact, respectively, the motor and the frame to which the motor is attached.

A preferred form of the invention is illustrated in the accompanying drawings in which:

Figure 1 is a plan view of a motor mount constructed in accordance with the principles of this invention;

Fig. 2 is a side elevation, partly in section, taken from the bottom of Fig. 1; and Fig. 3 is a side elevation, partly in section, taken from the right of Fig. 1.

The motor mount that is illustrated in the drawings includes a U-shaped member 3 having outwardly extending flanges or feet 5 at opposite ends thereof which are provided with slotted bolt holes 7 whereby the member 3 may be adjustably bolted to the engine or to the frame, it being preferred to attach the member 3 to the frame as diagrammatically represented at F. The member 3 has the side legs 9 perpendicular to feet 5 and a base portion 11 joining the side legs 9 which is parallel to feet 5.

Arranged at right angles to the member 3 is a similar member 13 of inverted U-shape and it has outwardly extending feet or flanges 15, with bolt holes 16, which may be reinforced by side gussets 17 welded at 19 to the feet 15, though it will be recognized that the gussets 17 can be omitted or can be formed integrally in a suitable stamping operation or otherwise attached to the feet 15. The member 13 has side legs 21 and a base section 23 joining the side legs. The members 3 and 13 are substantially hat shaped in section.

The metal members 3 and 13 are resiliently joined together by the rubber body 25 which is bonded or molded to both members, suitable radii 26 being provided to eliminate localized stress regions. As is evident in the drawings, the body 25 has a length substantially equal to the distance between side legs 21, a width substantially equal to the distance between side legs 9. Its height or thickness is somewhat greater than the distance between the planes defined by the bottoms of feet 5 and 15 so that rubber is exposed on the top and bottom of the mount and will engage the surfaces of E and F and be compressed when the feet 5 and 15 are drawn up tight against these surfaces by bolts (not shown) threaded into them through holes 7 and 16. Both bases 11 and 23 are embedded in the rubber body 25 and define top and bottom zones 27 and 29 of rubber and an intermediate zone 31 between the bases. It will be seen that there is clearance between the side edges of bases 11 and 23 and the side legs 21 and 9 so that horizontal relative movement in two directions (or about a vertical axis) can be resiliently accommodated, maximum resistance being along the length of member 13 because of the greater length of rubber in that direction. The dimensions of the parts can obviously be arranged to suit anticipated loads and amplitudes of relative movement. When the engine and frame E and F move toward each other, this will tend to put zones 27 and 29 in compression and zone 31 in compression and when they move apart, the stress tendencies will be reversed. In all cases the zone 31 will resist rebound and this will usually be in compression when the unit is used as a compression, as distinct from a suspension, type mount. Should complete failure of the bond between the rubber and the member occur, the engine and frame will still be positively tied together because of the criss-cross, interlocking arrangement of members 3 and 13.

I claim:

1. A mounting for spaced apart surfaces comprising a pair of U-shaped members having legs and base sections and having outwardly extending flanges defining planes of attachment for said respective members, said members being arranged at right angles to each other intermediate the legs of the other, and a rubber mass surrounding said base sections and filling the space inside of both said U-shaped members and projecting outwardly beyond the planes defined by the flanges, and means on said respective members for securing said mounting to said spaced apart surfaces with opposite faces of said rubber mass respectively engaging said spaced apart surfaces.

2. In a motor mount for resiliently interconnecting an engine and a frame, first and second hat-shaped members each having a flat base section and a pair of spaced legs extending substantially at right angles to the base section, each of said legs having feet extending outwardly and substantially parallel to the base section, said feet including means for securing the respective members to an engine and frame, said members extending in opposite directions so that the respective feet define spaced and substantially parallel planes, the members being criss-crossed and interfitted with the base section of each located intermediate the legs and intermediate the feet and spaced inwardly from the base section of the other, and a rubber body bonded to all of said legs and base sections and extending over the combined lengths of said legs and entirely across the spacing between said legs, opposite faces of said rubber body engaging said engine and frame when said pairs of feet are secured respectively to said engine and frame.

3. The invention set forth in claim 2 wherein said rubber body projects beyond the faces of both of said pairs of feet.

4. The invention set forth in claim 2 wherein said interfitted base sections divide the rubber body into two outer zones and an inner zone.

5. The invention set forth in claim 4 wherein each of said zones is of approximately the same thickness.

6. The invention set forth in claim 2 wherein the legs of one of said pair of legs are farther apart than the legs of the other pair of legs.

References Cited in the file of this patent

UNITED STATES PATENTS

| | | |
|---|---|---|
| 1,696,602 | Harder | Dec. 25, 1928 |
| 2,215,743 | Saurer | Sept. 24, 1940 |
| 2,308,458 | Saurer | Jan. 12, 1943 |

FOREIGN PATENTS

| | | |
|---|---|---|
| 662,294 | Great Britain | Dec. 5, 1951 |